United States Patent
Kaufman

[19]

[11] Patent Number: 5,984,146
[45] Date of Patent: *Nov. 16, 1999

[54] DISPENSER HAVING FOAMED OUTPUT

[76] Inventor: John G. Kaufman, 858 Condor Drive, Burlington, Ontario, Canada, L7T 3A7

[*] Notice: This patent issued on a continued prosecution application filed under 37 CFR 1.53(d), and is subject to the twenty year patent term provisions of 35 U.S.C. 154(a)(2).

[21] Appl. No.: 08/720,109

[22] Filed: Sep. 27, 1996

[51] Int. Cl.[6] .................................................. B65D 37/00
[52] U.S. Cl. ........................ 222/190; 222/207; 222/209; 222/215
[58] Field of Search ................................. 222/207, 209, 222/212, 215, 190, 195

[56] References Cited

U.S. PATENT DOCUMENTS

| | | | |
|---|---|---|---|
| 1,995,215 | 3/1935 | Mehlsen et al. | |
| 2,680,010 | 6/1954 | Dubay | 261/124 |
| 3,422,993 | 1/1969 | Boehm et al. | 222/190 |
| 3,471,064 | 10/1969 | Micallef | 222/211 |
| 3,622,049 | 11/1971 | Thompson | 222/190 |
| 3,709,437 | 1/1973 | Wright | 239/343 |
| 3,985,271 | 10/1976 | Gardner | 222/190 |
| 4,018,364 | 4/1977 | Wright | 222/190 |
| 4,022,351 | 5/1977 | Wright | 222/145 |
| 4,147,306 | 4/1979 | Bennett | 239/327 |
| 4,184,615 | 1/1980 | Wright | 222/190 |
| 4,324,349 | 4/1982 | Kaufman | 222/207 |
| 4,429,834 | 2/1984 | Ito | 239/327 |
| 4,432,496 | 2/1984 | Ito | 239/327 |
| 4,516,697 | 5/1985 | Dreps et al. | 222/212 |
| 4,635,828 | 1/1987 | Kaufman | 222/185 |
| 4,645,097 | 2/1987 | Kaufman | 222/207 |
| 4,957,218 | 9/1990 | Ford, Jr. | 222/1 |
| 5,033,653 | 7/1991 | Kaufman | 222/185 |
| 5,060,830 | 10/1991 | Krall | 222/212 |
| 5,217,147 | 6/1993 | Kaufman | 222/185 |
| 5,222,633 | 6/1993 | Blake | 222/179 |
| 5,238,155 | 8/1993 | Blake, III | 222/190 |
| 5,398,845 | 3/1995 | Meyer | 222/1 |
| 5,427,279 | 6/1995 | Kaufman | 222/207 |
| 5,439,140 | 8/1995 | Meyer | 222/110 |
| 5,476,198 | 12/1995 | Jouillat et al. | 222/328 |
| 5,544,788 | 8/1996 | Meyer | 222/10 |
| 5,590,817 | 1/1997 | Kaufman | 222/207 |

FOREIGN PATENT DOCUMENTS

| | | |
|---|---|---|
| 545232 | 12/1973 | Switzerland . |
| 1164602 | 9/1969 | United Kingdom ............ B05B 11/00 |

*Primary Examiner*—Kenneth Bomberg
*Attorney, Agent, or Firm*—Rogers & Scott

[57] ABSTRACT

Dispensers for liquids are provided having structure for containing a pool of liquid in the dispenser, to a predetermined level. A discharge chamber contains air above the level of liquid and a discharge device extends upwardly at least partly through the discharge chamber from below the level of the pool and has an external outlet. The discharge device includes a foamer chamber having a wall defining very small holes located above the pool level, and pressure means is coupled to the discharge chamber and operable to increase the pressure in the discharge chamber so that a pressure applied on the pool level drives liquid into the discharge device. Simultaneously air is forced through the small holes in the foamer chamber to meet the liquid passing through the foamer chamber where progressive foaming takes place before the resulting foam is forced through a discharge outlet.

16 Claims, 3 Drawing Sheets

DISPENSER HAVING FOAMED OUTPUT

FIELD OF THE INVENTION

This invention relates to dispensers for liquids, the dispensers being operable manually or by a suitable actuator to disturb an equilibrium in pressure in the dispenser which in turn results in dispensing, and more particularly to such a dispenser which turns the liquid to foam as dispensing takes place.

BACKGROUND OF THE INVENTION

Products in liquid form have for many years been packaged in a variety of containers suitable for shipping, displaying, handling and eventual sale. These containers have been made in a great variety of shapes and sizes with different types of closures. They include glass containers, and containers of synthetic materials which have been moulded, blow-moulded and generally formed into shape. Also, because of the nature of these plastics materials, the closures can be of many various types including screw caps, flip tops, and simple bonded seals. In general, containers of these types have been made to enhance the appearance and visual affect of the product.

Some liquids packaged in such containers are used in small quantities and is convenient to dispense such liquids in the form of a foam provided of course that the liquid is suitably formulated.

The limitations to dispensing foam are found in the complex structures previously used to create foam. These structures are desirable in order to minimize the use of aerosol containers designed to create foam but the cost of the structures and the difficulties of recycling structures having many different materials have severely limited the use of dispensing structures for foam.

Some very simple dispensers are taught by the present applicant in U.S. Pat. Nos. 4,324,349; 4,635,828; 4,645,097 and 5,033,653. Such dispensers have become known as Kaufman dispensers (after the inventor). The dispensers have no moving parts and yet satisfy the requirements of clean dispensing with temperature compensation to permit the dispenser to be subjected to a designed range of temperature fluctuation without inadvertent dripping or dispensing.

The structures shown in the applicant's earlier patents have a self-contained reservoir containing some of the liquid to be dispensed and in communication with the main part of the dispenser which is in the form of a container where the major volume of the liquid is stored. Air is trapped above the liquid in the container under a negative pressure to establish equilibrium and thereby prevent liquid flowing through the reservoir and out through a discharge passageway. When the negative pressure is disturbed, liquid will tend to flow out of the container and into the reservoir, then out via the passageway. As soon as the negative pressure is restored by sucking air back through the passageway, a condition of equilibrium is again achieved. As the air is sucked back, liquid is cleaned out from the passageway and some of the air finds its way through the liquid to finish above the liquid in the container while some remains in the reservoir.

The embodiments of the present invention include dispensers based on the Kaufman technology as well as others which use simple squeeze-bottles as a basis.

DESCRIPTION OF PRIOR ART

As mentioned previously, this invention includes embodiments which use principles found in applicant's earlier U.S. Pat. Nos. 4,324,349; 4,635,828; 4,645,097 and 5,033,653. However, in the present invention liquid is foamed as it is dispensed.

Prior art dispensers for foaming are available in two types. Firstly, there is a dispenser which incorporates a porous material through which a foamable liquid is forced. Examples are U.S. Pat. No. 3,422,993 to Boehm et al and U.S. Pat. No. 3,985,271 to Gardner. In the second type of foamer, the foamable liquid is forced into a jet of air, creating foam which is then dispensed. Examples are U.S. Pat. No. 3,709,437 to Wright, and U.S. Pat. No. 4,019,657 to Spitzer et al.

Foamers of the first type, which use a porous material, have a disadvantage in that they require significant pressure to push the liquid through the porous material. Also, they often need a separate return air path with a check valve so that the suckback of air into the dispenser is not delayed by pressure losses in the porous material. A further drawback is that the porous material can not be used with liquid which contains fine particulates because the particulates will build up in the porous material and limit flow through it. Although foamers of the second type do not suffer from the same disadvantages, the foam produced by the second type tends to be coarse and varies with the force applied to dispense.

A general problem with dispensers using both types of foamer is that the foamer must be located at the top of the dispenser with a dip tube to pick up liquid from the bottom. This is because firstly the foamer must initially be clear of the liquid filling the container, and secondly as the liquid level falls, the dispenser must continue to dispense until it empties. As a result, the pressure needed to dispense demands a dispensing force great enough to lift the viscous liquid up a long dip tube and into the foamer where more force is needed to cause foaming and eventual dispensing. A further difficulty with prior art dispensers also results from the arrangement of dip tube and foamer. As the liquid level falls, the rate at which the foamable liquid passes through the foamer will vary for a constant dispensing force because more and more of the energy available from the force will be lost in compressing air in the dispenser. In other words at a higher liquid level, the rate that the liquid passes the foamer is great and produces a wet foam, and at a lower liquid level, an increased amount of air in the container passes through the foamer with the liquid, thereby exhausting the energy available from the action of squeezing. The result will be a very dry foam.

Accordingly, it is among the objects of the present invention to provide a simple dispenser which dispenses selected liquids as foams and which will tend to provide a consistency of foam.

SUMMARY OF THE INVENTION

A dispenser is provided for dispensing liquid. The dispenser has structure for containing a pool of liquid to a predetermined level. A discharge chamber contains air above the predetermined level of liquid and a discharge device extends upwardly at least partly through the discharge chamber from below the level of the pool and has an external outlet. The discharge device includes a foamer chamber having a wall defining very small openings located above the pool level, and pressure means is coupled to the discharge chamber and operable to increase the pressure in the discharge chamber such that pressure applied on the pool level drives liquid into the discharge device. Simultaneously air is forced from the discharge chamber through the small openings in the foamer chamber to meet the liquid passing through the foamer chamber where progressive foaming rakes place before the resulting foam is forced through a discharge outlet.

BRIEF DESCRIPTION OF THE DRAWINGS

The invention will be more readily understood with reference to the following drawings, in which.

DESCRIPTION OF THE PREFERRED EMBODIMENT(S)

Figure 1:
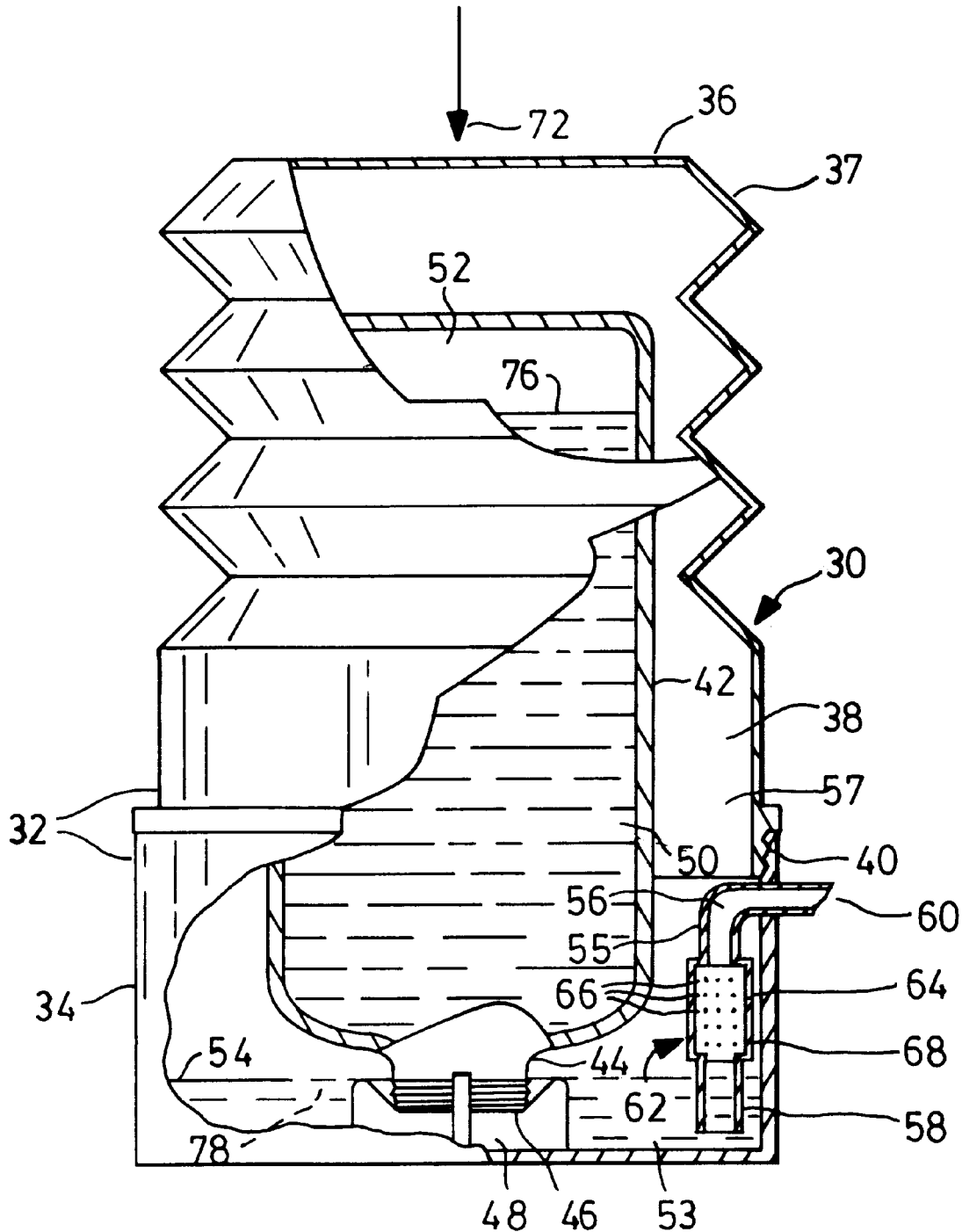
FIG. 1 shows a partially cutaway simplified side view of a dispenser according to a preferred embodiment of the invention when dispensing is required from the side of the dispenser near the bottom.

Reference is first made to FIG. 1, which shows an exemplary embodiment which is preferred when dispensing from the side and near the bottom. A dispenser 30 has a generally cylindrical housing 32 in two parts, namely a base 34 which is shaped to sit on a flat surface such as a table or a countertop during use, and above that, a top 36 including a resiliently deformable bellows 37 extending upwardly from the base 34. The base 34 and the top 36 form an essentially closed cavity 38 within the housing 32 and the top 36 can be unscrewed from the base 34 at complementary threads 40 and then lifted from the base 34 to provide access to the base. The cavity 38 contains a refillable receptacle 42 in the form of an inverted bottle having a neck 44 and a bottom opening 46. The receptacle rests on a x-shaped support 48 in the base 34 to provide clearance for liquid to flow out through the opening 46.

In use, the receptacle 42 contains a supply of foamable liquid 50 which is suspended in equilibrium by a negative pressure in a space represented generally by the numeral 52 and maintained because the liquid has formed a pool 53 and come to a natural level 54 in the base above the opening 46 in the bottle. The space above the pool and around the receptacle is a discharge chamber which will be pressurized for dispensing.

The receptacle 42 is installed with the top 36 removed from the base 34 by inverting and dropping the bottle onto the support 48. As a result the foamable liquid 50 will flow from the receptacle 42 through the opening 46 into the base 34 until equilibrium is reached with the liquid at a selected level 54 in the base. The top 36 can then be replaced to complete the assembly.

As liquid is dispensed, it passes through a discharge device 55 consisting of an inlet passage 58 leading upwardly from below the liquid level 54 to a foamer chamber 62 which is coupled to the inlet passage to receive liquid, and then to an outlet passage 56 which is also coupled to the chamber 62 and which feeds foam through this passage and out via the external outlet 60.

The foamer chamber 62 is adjacent the liquid level 54 which (as will be described) returns to substantially the same level after each action to dispense the liquid. A cylindrical wall 64 of the chamber 62 is perforated by a plurality of very small pin-prick sized holes 66 and the holes are kept as short in length as possible to minimize the risk of plugging.

In operation, the top 36 is pressed downwardly by applying a force in the direction of arrow 72 to compress the bellows 37 and thereby increase the pressure of the air in the discharge chamber about the receptacle 42 This increases the pressure on the surface of the foamable liquid 50 at the liquid level 54 and forces the foamable liquid 50 upwardly through the discharge device 55. Initially liquid moves through inlet passage 58, then into the foamer chamber 62 where it is foamed, and finally out through passage 56 and outlet 60. While this is happening the increased pressure in the discharge chamber causes air to flow through the plurality of holes 66 and into the foamer chamber 62 where it meets the foamable liquid 50. As a result there is a violent mixing and expansion which results in foam created from the bottom to the top of the foamer chamber 62. To better understand this, imagine a horizontal layer of liquid entering the chamber 62. The lowermost ones of the holes 66 will direct air into the liquid causing some mixing and expansion. The expanded layer then moves upwardly to be influenced by the next set of holes where more mixing and expansion takes place. This progressive process continues until the fully expanded foam leaves via the passage 56. It has been found that this volumetric expansion can be as much as sixty times the original volume and the foam produced is wet and stiff.

It will be evident from this that the pressure on level 54 to drive the liquid through the discharge device 55 is relatively small because the viscous liquid 50 has only a short distance to travel through the inlet passage 58 before foaming commences. After foaming the pressure required to move the foam upwardly and out is much smaller and to some extent it is driven not by the force on the liquid but by the air and the resulting expansion in the chamber 62. To accommodate these characteristics, and to make discharge more efficient, the inlet passage 58 is relatively wide and the outlet passage 56 can be narrower to accelerate the flow. This arrangement minimizes energy losses so that the travel of the bellows 37 and the force applied to the bellows can be minimized. However it should be noted that there is a balance between the back pressure caused by the passage 58 and the air flow into chamber 62. Since both flows are driven by the same pressure, an increase in back pressure will result in a greater air/liquid ratio and a decrease in back pressure will give a lesser air/liquid ratio.

It will be evident that because the volume of air in the dispenser cavity 38 is substantially constant no matter how much liquid 50 remains in the receptacle 42, the "feel" noticed by the user will remain the same thereby promoting similar repetitive dispensing actions and hence constant foam.

Upon release of the top 36, the resilient bellows 37 will return to its original shape thereby sucking air inwardly through the outlet 60 of the discharge device 55 into the cavity 38, primarily through holes 66. This has the beneficial result of pulling the foam in the passage 56 back into the housing 32 so that the outlet 60 does not drip, and at the same time stripping any material which may have occluded or otherwise covered the holes.

After the dispenser has returned to an equilibrium condition ready for further use, the liquid will have found a new level in the receptacle 42 as some air is sucked back and enters the receptacle to replace dispensed liquid. At the same time level 54 in the housing 32 will have returned to substantially the same level as it was before dispensing. Consequently, before dispensing takes place, the receptacle 42 has combined with the base 34 to control the level 54 and hence the spacing between this level and the foamer chamber 62.

It should be noted that the actual size and location of the holes 66 will depend on the number of holes, the viscosity of the liquid, and the dimensions and type of the dispenser. Once the desired type of foam is achieved through calibration of these criteria, the dispenser will dispense this type of foam with an improved consistency throughout its use from when the supply receptacle 42 is full to when it is empty.

When the level of liquid 76 in the receptacle drops to near the level 54, there will be an equalization until the level drops below the opening 46. Dispensing will continue as long as the inlet passage 58 is in the liquid but there may be a small variation in the foam due to the fact that the level has dropped slightly. Clearly, this can be minimized by choosing the relative locations of the opening 46 and inlet passage 58.

When the supply receptacle 42 is empty, because of its inversion, the liquid 50 in the receptacle 42 has fully drained from the inside leaving substantially no residue. The receptacle 42 can then either be refilled from a bulk container or replaced by a full receptacle following the aforementioned procedure.

As an example of one embodiment, the preferred embodiment has a chamber 62 of approximately 10 mm (0.4 inches) diameter, and a wall thickness of 0.5–1 mm. (0.02–0.04 inches). There are approximately 200 holes having diameters of about 0.5 mm (0.02 inches) and the lower portion of the passage 58 has an internal diameter of 6 mm (0.24 inches) whereas the upper passage 56 has an internal diameter of about 4 mm (0.16 inches). The diameter of the chamber is to some extent dictated by the space needed to provide the holes 66 and can be the same as the diameter of the passage 58.

The chamber 62 is located approximately 10 mm (0.4 inches) above the liquid level 54 and the inlet to the passage 58 is located approximately 10 to 20 mm (0.4 to 0.8 inches) below the liquid level 54.

The liquid used was a typical dishwasher detergent diluted by adding 3 parts water. However any liquid containing surfactants will be suitable, possibly after tuning the physical relationships in the discharge device 55 to give the desired output both in terms of volume and consistency.

The consistency of foam obtained can be varied for a given dispenser by providing one of a set of inserts in the passage 58 or by reducing the diameter of the inlet 58 thereby changing the rate of air to liquid arriving in the foamer chamber 62. The higher the air to liquid ratio the drier the foam. The number of holes and or the diameter of the holes 66 can be varied to also change the air to liquid ratio. Calibration of these dimensions for a particular viscosity liquid and required foam consistency can easily be carried out to obtain a desired type of foam.

A variety of alternative pressure increasing devices can be used to increase the pressure inside the housing. Examples are, a squeeze bottle, a squeeze bulb, a hand pump, an electric air compressor, and a compressed gas cylinder controlled by a valve.

It should be noted that the rate of change in pressure must be such that the desired type of foam is obtained. For instance, if the change of pressure is too slow, air may seep through the holes 66 without lifting the liquid in the passage. As a result very little foam would be produced.

Preferably all the components of the dispenser are of synthetic plastics materials which are easily moulded, durable and sanitary. Parts which are not meant to be deformed can also be of glass or even metal.

Figure 2:
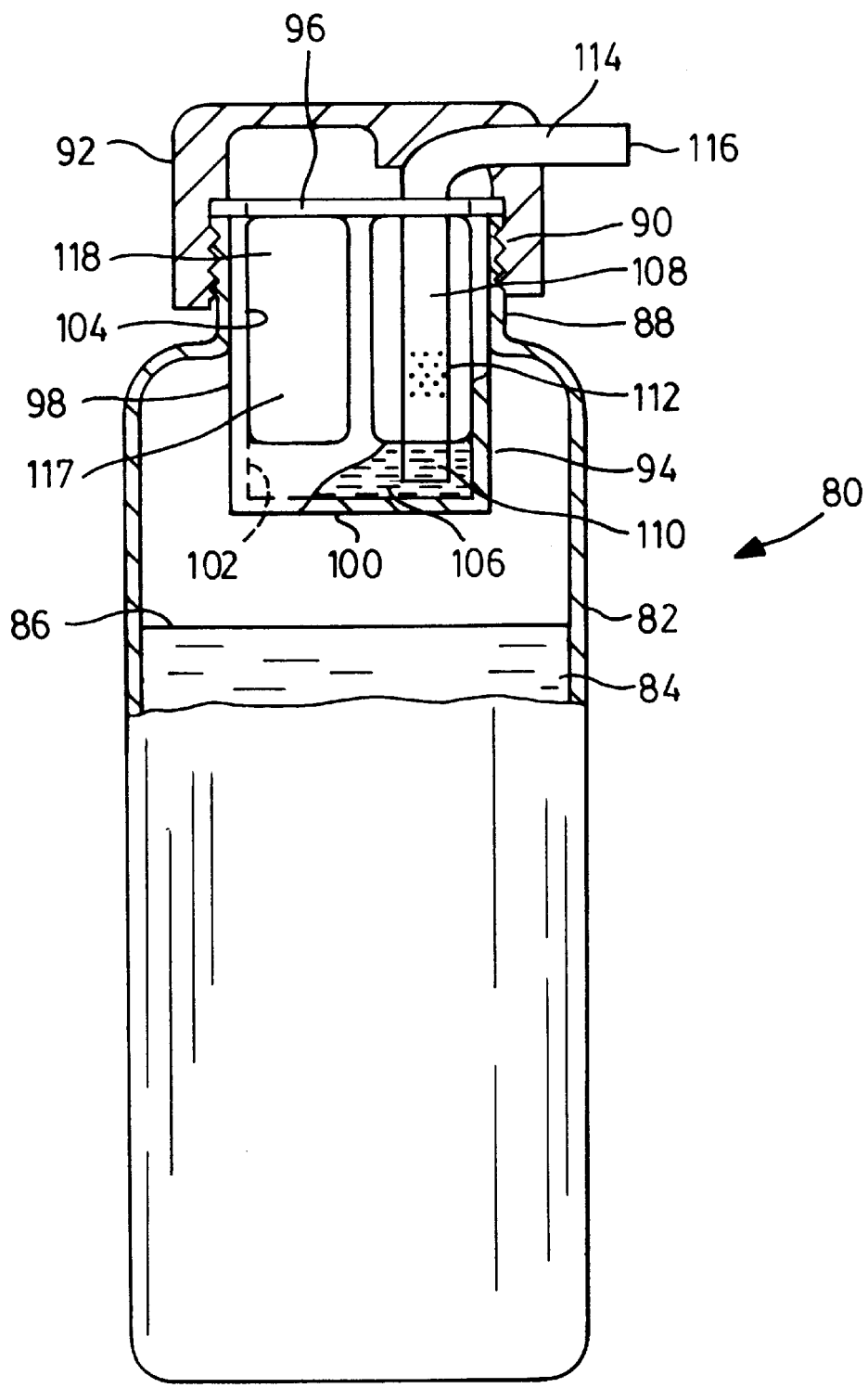
FIG. 2 is a view similar to FIG. 1 and illustrating an embodiment to be preferred for dispensing from the top of the dispenser.

Reference is next made to FIG. 2 which illustrates a different embodiment incorporating the invention. This embodiment is to be preferred where foam is to be dispensed from adjacent the top of the dispenser as opposed to the side as shown in FIG. 1.

As seen in FIG. 2, a dispenser indicated generally by the numeral 80 includes a resiliently deformable receptacle 84 shown containing a supply of liquid 82 at a level 86. The container defines an upwardly opening neck 88 having a complementary thread 90 with a cap 92 so that the cap can be drawn onto the neck A reservoir structure 94 includes a peripheral rim 96 which is trapped between the neck 88 and the cap 92 to positively locate the reservoir structure relative to the receptacle 82.

The reservoir structure 94 is an inverted bell shape made up of a peripheral side wall 98 which extends from the rim 96 and fits within the neck 88, and a bottom wall 100 which combines with a lower part of the side wall 98 to define a reservoir 102. Above the reservoir, openings 104 are provided in the side wall 98 for reasons which will be explained. For the moment it is sufficient to understand that the reservoir 102 contains liquid to a level defined by the lower extremity of the openings 104 thereby maintaining a predetermined level of liquid in a pool 106 in the reservoir 102.

A discharge device 108 extends upwardly from within the pool 106 and includes an inlet passage 110, foamer chamber 112, and outlet passage 114 terminating at an external outlet 116.

The structure defines a discharge chamber around and above the pool 106 and this chamber is subject to pressure change when the resiliently deformable receptacle 82 is squeezed. It will be clear that this is because the level of liquid will tend to rise in the receptacle 82 thereby reducing the volume of the air in the discharge chamber and causing compression. This compression will work to push the level of liquid down in the pool 106 thereby forcing it into the discharge device 108 which opens to atmosphere. As before, liquid will flow into the discharge device 108 through the inlet passage 110 and then reach the foamer chamber 112 where progressive foaming will take place before the foam passes through the outlet passage 114 leaving by the external outlet 116.

The structure shown in FIG. 2 has limitations because of the way it is used. Clearly after a single dispense a substantial part of the liquid will be displaced through the reservoir, and on suck back, when the user ceases to squeeze the container 82, air will flow back through the discharge device and some of it may tend to blow liquid out of the reservoir 102 through the opening 104 and back down into the receptacle 82. The user must then temporarily invert the dispenser so that the liquid 84 in the receptacle 82 will fall down and go through the openings 104. As the container is righted, the liquid will fall into the reservoir 102 and excess will spill out of the openings leaving the reservoir full of liquid thereby again forming the pool 106. The limitation to this structure lies in the fact that not all liquids will move sufficiently quickly for this action to be effective. Thick shampoo-like liquids may not be suitable but thinner liquids such as those used to clean windows would be suitable for this embodiment of the dispenser. It will also be appreciated that the discharge device 108 must be made to suit the liquids and pressures employed and as mentioned earlier, the shapes and sizes of the very small pin-prick openings in the foamer chamber will have to be selected to meet the requirements. It has also been found that the location of this chamber relative to the overall height of the discharge device can have an effect on the condition of the foam and this would also be subject to some experiment for a given liquid.

Figure 3:
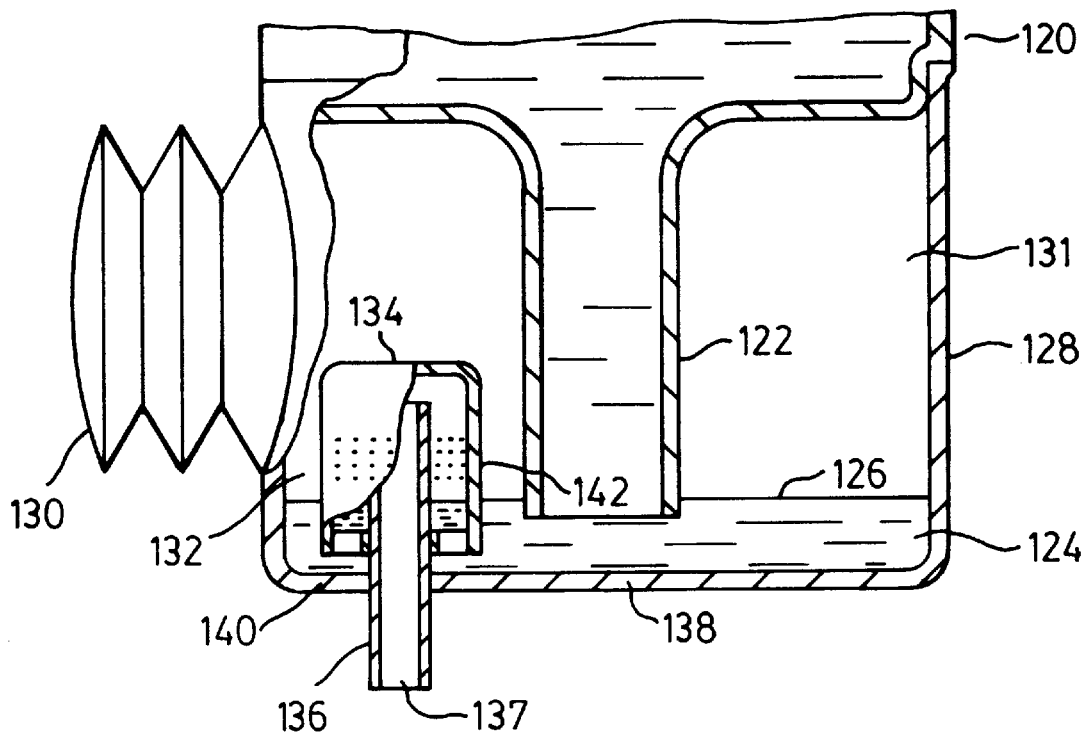
FIG. 3 is a view similar to FIG. 1 and illustrating an embodiment to be preferred for dispensing from the bottom of the dispenser

In some instances it may be preferable to have a dispenser which is in a fixed location such as hanging on a wall and have the external outlet below the dispenser with an actuator above the outlet. This would allow the user to put one hand under the outlet while the other operates the actuator. Such an embodiment is illustrated somewhat diagrammatically in FIG. 3. Here it will be seen that a receptacle 120 has a neck 122 projecting into a pool 124 of liquid at a level 126. A base structure 128 extends from the receptacle 120 to contain the pool 124 and incorporates a resiliently deformable bellows 130 for manual operation to change the pressure within a discharge chamber 131 formed above the level 126 of liquid. A discharge device 132 includes a bell-shaped part 134 and an outlet passage 136 which projects through a bottom 138 of the base structure 128. A perforated disk 140 is provided between the outlet passage 136 and the bell-shaped part 134 to attach the parts one to another while providing clearance for liquid flow. The lower portion of the bell-shaped part 134 effectively provides an inlet passage leading to a foamer chamber 142 which in turn leads to an upper end of the outlet passage 136.

In operation, when the bellows 130 is operated, the reduced volume of the discharge chamber results in an increase in pressure on the level 126 of liquid in the pool 124 and at the same time air pressure is applied to the foamer chamber 142 through the very small openings formed in the wall of the bell-shaped part 134. The operation will be similar to that already described although in this case when the foam is created, it will go upwardly initially and then move downwardly through the outlet passage 136. On suck back, foam will tend to be drawn back into the dispenser to minimize dripping and air will be forced through the openings in the foamer chamber as it was in the other embodiments.

It is anticipated that numerous embodiments can be created using the invention. Some of those embodiments have been described in exemplary fashion for different purposes but it is within the scope of the invention for other embodiments to be created Such embodiments are within the scope of the claims.

I claim:

1. A dispenser for dispensing liquids, the dispenser having:
    a receptacle for the liquid;
    means for containing a pool of liquid to a predetermined level, said means being in communication with the receptacle for replenishing the pool of liquid;
    a discharge chamber above said level for containing air above said level;
    a discharge device having an inlet passage extending upwardly from below said level to convey liquid from said pool, a foamer chamber attached to the inlet passage to receive liquid from the inlet passage, the foamer chamber having a generally cylindrical wall in the foamer chamber defining very small holes located above said predetermined level, the holes perforating the wall circumferentially and being spaced vertically in the wall, and an outlet passage extending from the foamer chamber and having an external outlet through which foam is to be dispensed; and
    pressure means coupled to the discharge chamber for increasing the pressure in the discharge chamber to drive liquid into the discharge device and simultaneously force air through said holes to meet the liquid in the foamer chamber as the liquid rises through the foamer chamber so that the rising liquid is exposed sequentially to individual streams of air passing through the holes thereby causing progressive foaming of the liquid as the progressively foamed liquid meets more holes in travelling vertically, so that the foaming is enhanced as the progressively foamed liquid passes all of the holes resulting in a completed foam which is driven through the outlet passage and issues through the outlet.

2. A dispenser as claimed in claim 1 which the receptacle is a downwardly opening and has a bottom opening positioned to be in the pool of liquid.

3. A dispenser as claimed in claim 2 in which dispenser includes a housing defining the discharge chamber and the means for containing the pool of liquid, the housing surrounding the receptacle.

4. A dispenser as claimed in claim 3 in which at least part of the housing further includes said pressure means.

5. A dispenser as claimed in claim 3 in which the external outlet of the discharge device is located above said predetermined level.

6. A dispenser as claimed in claim 4 in which said pressure means is a bellows.

7. A dispenser as claimed in claim 2 in which the external outlet from the discharge device is located below said pool of liquid.

8. A dispenser as claimed in claim 7 in which the foamer chamber is bell-shaped and the outlet passage extends downwardly from within the foamer chamber terminating at said external outlet.

9. A dispenser as claimed in claim 1 in which the means for containing the pool of liquid is within the receptacle adjacent the top of the dispenser and in which the receptacle holds a supply of the liquid below said means so that the discharge chamber is above the supply of liquid, said means having openings to receive liquid from said supply upon temporarily inverting the dispenser.

10. A dispenser as claimed in claim 9 in which the receptacle is resiliently deformable to provide said pressure means.

11. A dispenser as claimed in claim 9 in which the external outlet from the discharge means is located above the receptacle.

12. A dispenser as claimed in claim 1 in which said pressure means is a bellows.

13. A dispenser for dispensing liquids, the dispenser having:
    a housing including structure to change the pressure in the housing;
    a receptacle for liquid to be dispensed, the receptacle being positioned within the housing and having an opening at the bottom of the receptacle so that the liquid will exit the receptacle into the housing sufficient to form a pool having a predetermined level above the opening and thereby trap the remaining liquid in the receptacle with a negative pressure above the liquid in the receptacle in an equilibrium condition; and
    a discharge device having an inlet passage extending upwardly from below said level to convey liquid upwardly, a foamer chamber within the discharge chamber for receiving liquid from the inlet passage and having a tubular wall extending upwardly and defining very small openings about the wall and along the vertical extent of the wall spaced in the wall along the upward extent of the wall and located above said level, and an outlet passage leading from the foamer chamber and having an external outlet through which the foam is to be dispensed, whereby activating said structure to increase the pressure within the housing drives the liquid through the inlet passage into the foamer chamber and simultaneously force air through the holes to meet the rising liquid so that the rising liquid is exposed sequentially to individual streams of air passing through the holes thereby causing progressive foaming of the liquid as the progressively foamed liquid meets more holes in travelling vertically so that the foaming is enhanced as the progressively foamed liquid passes all of the holes resulting in a completed foam which is driven through the outlet passage and issues through the outlet.

14. A dispenser as claimed in claim 13 in which said structure is a bellows.

15. A dispenser as claimed in claim 13 in which the housing includes a base and a top, the base and top being releasably coupled to permit replacement of the receptacle.

16. A dispenser as claimed in claim 15 in which the receptacle is an inverted bottle and in which the base defines a stand to support the bottle such that the liquid can flow from the bottle into the housing and so that all of the liquid will eventually leave the bottle.

* * * * *